(12) United States Patent
Wold et al.

(10) Patent No.: US 7,658,156 B2
(45) Date of Patent: Feb. 9, 2010

(54) APPARATUS AND METHOD FOR DELIVERING BENEFICIAL AGENTS TO SUBTERRANEAN LOCATIONS

(75) Inventors: Truman Wold, Salt Lake City, UT (US); Ashok V. Joshi, Salt Lake City, UT (US); Sai Bhavaraju, West Jordan, UT (US)

(73) Assignee: Microlin, LLC, A Utah Limited Liability Company, Salt Lake City, UT (US)

( * ) Notice: Subject to any disclaimer, the term of this patent is extended or adjusted under 35 U.S.C. 154(b) by 0 days.

(21) Appl. No.: 12/100,982

(22) Filed: Apr. 10, 2008

(65) Prior Publication Data
US 2009/0255451 A1 Oct. 15, 2009

(51) Int. Cl.
*A01C 23/02* (2006.01)
(52) U.S. Cl. .................................................. 111/7.3
(58) Field of Classification Search ................ 111/118, 111/200, 900, 7.1–7.4, 127
See application file for complete search history.

(56) References Cited

U.S. PATENT DOCUMENTS 281,942 A * 7/1883 Sutton ........................ 239/372

* cited by examiner

*Primary Examiner*—Christopher J. Novosad
(74) *Attorney, Agent, or Firm*—David Fonda

(57) ABSTRACT

An apparatus for delivering a beneficial agent to a subterranean location is disclosed in one embodiment of the invention as including a water collection chamber having a substantially open end. A water-transporting membrane is provided to communicate with the water collection chamber. An extraction chamber receives water through the water-transporting membrane, expanding the extraction chamber. A dispensing chamber, containing a beneficial agent such as fertilizer, is configured to contract upon expanding the extraction chamber. This causes the dispensing chamber to expel the beneficial agent through a subterranean delivery channel, such as a rigid hollow spike. In certain embodiments, a rate adjustment mechanism may control the rate that water is received through the water-transporting membrane, thereby controlling the rate the beneficial agent is expelled from the subterranean delivery channel.

19 Claims, 8 Drawing Sheets

APPARATUS AND METHOD FOR DELIVERING BENEFICIAL AGENTS TO SUBTERRANEAN LOCATIONS

BACKGROUND OF THE INVENTION

1. Field of the Invention

This invention relates to fertilizers and fertilizer dispensers, and more particularly to apparatus and methods for delivering beneficial agents, such as fertilizers, to subterranean locations.

2. Background

Today's gardeners are offered an immense array of choices when it comes to fertilizer products. While no fertilizer is perfect for every garden or situation, slow- and controlled-release fertilizers offer some important advantages over other fertilizer products. These fertilizers release nutrients over a relatively long period of time, rather than over a brief period as occurs with many liquid, powder, or granular fertilizers currently on the market. In general, slow-release fertilizers may release nutrients at a slow but unpredictable rate. In certain cases, the release rate may depend on the activity of organisms, the size of the fertilizer granules, or the amount of water in the soil. Controlled-release (often referred to as "coated") fertilizers, on the other hand, may release their nutrients at a more predicable rate over a period of time.

Both the slow- and controlled-release fertilizers may reduce the "feast-or-famine" effect that occurs when fast-release fertilizers are used. Using fast-release fertilizers, an abundance of nutrients may briefly surround the roots of a plant soon after application. These nutrients may be rapidly washed away or consumed, however, allowing nutrient deficiencies to occur. Furthermore, fast-release fertilizers may easily be applied in excess, potentially damaging the plants they are intended to nourish. Because slow- and controlled-release fertilizers release their nutrients gradually over time, each of the above problems may be reduced or minimized.

Environmental concerns provide yet another reason to use slow- and controlled-release fertilizers. In some areas of the country, fertilizers significantly contribute to waterway, stream, and groundwater pollution. Because slow- and controlled-release fertilizers release their nutrients over time, these fertilizers are less likely to be found in the amounts and concentrations needed to contribute to these types of pollution.

Although slow- and controlled-release fertilizers provide various advantages, they are not without shortcomings. For example, the water-solubility of many fertilizers may cause them to dissolve and leach into the soil below the roots, thereby never becoming available to the plants there are intended to nourish. Temperature may also undesirably affect fertilizer release rates. For example, in controlled-release fertilizers, temperature may affect nutrient diffusion across the coating. In slow-release fertilizers, temperature may exert a major influence on microbial activity, affecting the release of nutrients. In other cases, fertilizer granule or particle size may change as the fertilizer dissolves. This may affect the fertilizer particle or granule surface area and thus the release rate into the soil.

Furthermore, fertilizer granules or powders are frequently non-uniform in size and composition. Granules in particular may contain cracks and therefore tend to pulverize easily. The result is that it is often difficult to obtain a uniform and practical coating for many granular fertilizers. Furthermore, potential uses for a fertilizer may be difficult to anticipate at the time the fertilizer is manufactured. Thus, a particular coating and granular size, while appropriate for some applications, may be unlikely to provide desirable results in other applications.

In view of the foregoing, what are needed are apparatus and methods for delivering beneficial agents, such as fertilizers, including "fast-release" fertilizers, to subterranean locations in a controlled, predictable manner. Ideally, such an apparatus and method would be suitable to disperse a wide variety of different fertilizer products. Further needed are apparatus and methods for easily controlling the rate at which the beneficial agents are released into the soil.

SUMMARY OF THE INVENTION

The invention has been developed in response to the present state of the art and, in particular, in response to the problems and needs in the art that have not yet been fully solved by currently available fertilizers or fertilizer products. Accordingly, the invention has been developed to provide novel apparatus and methods for delivering beneficial agents to subterranean locations in a controlled and predictable manner. The features and advantages of the invention will become more fully apparent from the following description and appended claims and their equivalents, and also any subsequent claims or amendments presented, or may be learned by practice of the invention as set forth hereinafter.

Consistent with the foregoing, an apparatus for delivering a beneficial agent to a subterranean location is disclosed in one embodiment of the invention as including a water collection chamber having a substantially open end. A water-transporting membrane is provided to communicate with the water collection chamber. An extraction chamber receives water through the water-transporting membrane, expanding the extraction chamber. A dispensing chamber, containing a beneficial agent such as fertilizer, is configured to contract upon expanding the extraction chamber. This causes the dispensing chamber to expel the beneficial agent through a subterranean delivery channel, such as a rigid hollow spike. In certain embodiments, a rate adjustment mechanism may control the rate that water is received through the water-transporting membrane, thereby controlling the rate the beneficial agent is expelled from the subterranean delivery channel.

In selected embodiments, the extraction chamber and the dispensing chamber are separated by a piston. In other embodiments, the extraction chamber and the dispensing chamber are separated by a flexible diaphragm. Where a flexible diaphragm is used, in selected embodiments, the flexible diaphragm may include several layers to prevent or reduce the diffusion of water through the diaphragm. In certain embodiments, a separator material, such as air or another gas or mixture of gases may be introduced between the layers to further prevent the water diffusion. In other embodiments, the flexible diaphragm may be coated with a water-impermeable material, such as metal, to prevent or reduce diffusion.

In other embodiments, the extraction chamber, the dispensing chamber, or both may be contained at least partially within a pouch. In certain embodiments, the pouch may be coated with a water-impermeable material, such as metal, to prevent water from diffusing therethrough.

In certain embodiments, the extraction chamber contains an osmotic medium, such as a salt or a saline solution, to draw water from the water collection chamber through the water-transporting membrane and into the extraction chamber through osmosis. In other embodiments, the apparatus may include a circuit to allow electrical current to flow through the water-transporting membrane, thereby allowing water to travel through the water-transporting membrane into the extraction chamber through electro-osmosis. In yet other embodiments, the apparatus may include at least one additional delivery channel, in communication with the dispensing chamber, to deliver the beneficial agent to a surface or subterranean location.

In another embodiment in accordance with the invention, a method for delivering a beneficial agent to a plant may include collecting water into a water collection chamber. This water may be transported through a water-transporting membrane into an extraction chamber, thereby expanding the extraction chamber. This may cause a beneficial agent to be expelled from a dispensing chamber through multiple delivery channels for delivery to a plant at multiple discrete locations.

The present invention provides improved apparatus and methods for delivering beneficial agents to subterranean locations. The features and advantages of the present invention will become more fully apparent from the following description and appended claims, or may be learned by practice of the invention as set forth hereinafter.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings in which.

DETAILED DESCRIPTION OF THE INVENTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

For the purposes of this description, the term "fertilizer" is used to refer to all types of organic or inorganic compounds, minerals, chemicals, nutrients, agents, or the like given to plants to promote growth. Fertilizers may include, for example, nutrients containing nitrogen, phosphorus, potassium, calcium, sulfur, magnesium, boron, chlorine, manganese, iron, zinc, copper, molybdenum, or the like, to name a few. Similarly, the phrase "beneficial agent" may refer to any compounds, minerals, chemicals, or the like, including fertilizers, that are beneficial to plants, whether promoting growth or not.

Figure 1:
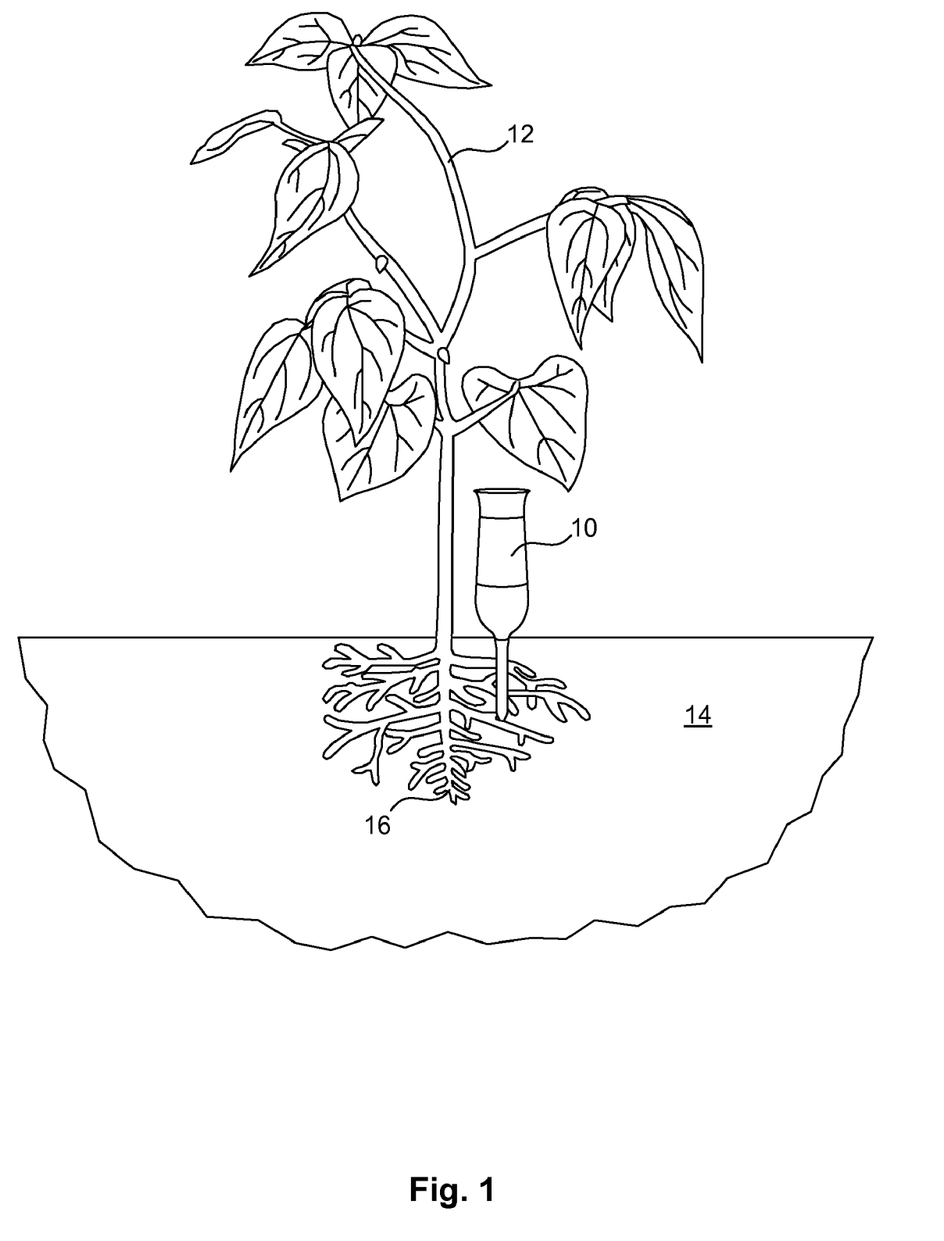
FIG. 1 is a perspective view of one embodiment of an apparatus in accordance with the invention for delivering beneficial agents to a plant.

Referring to FIG. 1, as previously mentioned, slow- and controlled-release fertilizers provide various advantages over other types of fertilizers. In particular, these fertilizers may reduce the "feast-or-famine" effect that occurs with fast-release fertilizers. That is, these fertilizers may ensure that nutrients are almost always available to plants when they are needed. Nevertheless, as previously discussed, slow- and controlled-release fertilizers may not be ideal for all applications and may have various shortcomings. For example, these fertilizers may dissolve and leach into the soil where they are unavailable to plants, have release rates that are undesirably affected by temperature or granule size, or have release rates that are not as controllable, stable, or predictable as desired.

In selected embodiments, an apparatus 10 or delivery device 10 may overcome many of the deficiencies of the prior art, as will be explained in more detail hereafter. In certain embodiments, a delivery device 10 may be inserted into soil 14 immediately surrounding a plant 12. This device 10 may deliver beneficial agents into the ground, where they may be accessible to the plant's roots 16. The delivery device 10 may provide the beneficial agents to the plant 12 at a release rate that is controlled, stable and/or predictable. As will be discussed in association with FIG. 9A, in certain embodiments, a rate adjustment mechanism may be used to tailor the release rate to a particular application, plant size, or desired release period.

In the illustrated examples, the delivery device 10 is shown as a spike-like device 10 that may be driven into the ground around a plant 12. This shape is used in FIGS. 2a through 9B to describe different embodiments of the invention. Although this shape provides various advantages, the delivery device 10 is not limited to this shape, but may include other shapes or configurations to fit or accommodate different applications.

Figure 2A:
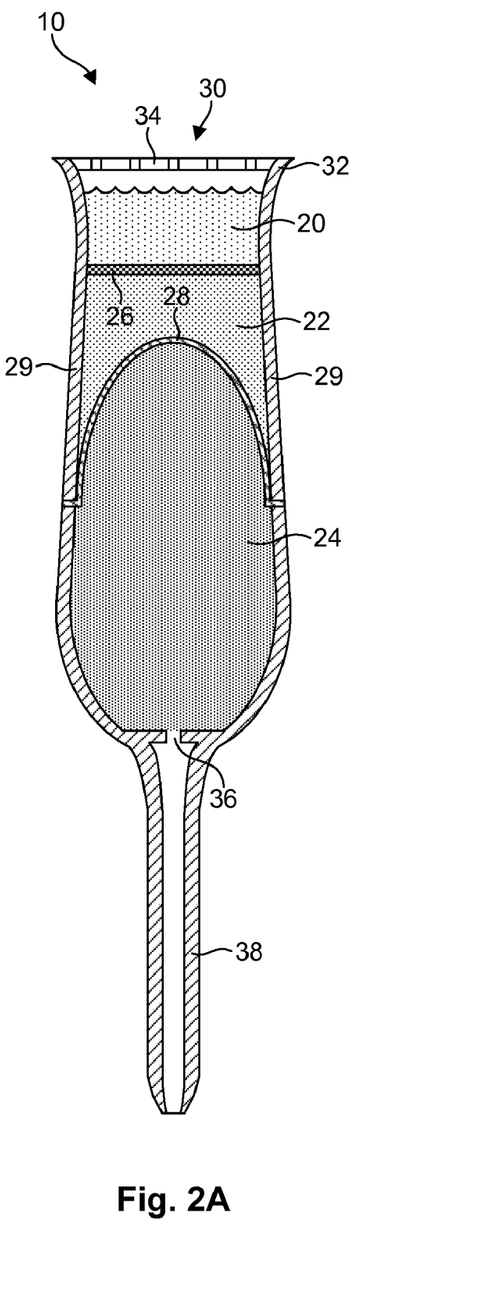
FIG. 2A is a cross-sectional profile view of one embodiment of an apparatus using a flexible diaphragm to separate an extraction chamber and a dispensing chamber.

Referring to FIG. 2A, in certain embodiments in accordance with the invention, a delivery device 10 may include a water collection chamber 20, an extraction chamber 22, and a dispensing chamber 24. The water collection chamber 20 and extraction chamber 22 may be separated by a water-transporting membrane 26, such as a semi-permeable polymeric membrane 26. Similarly, the extraction chamber 22 and the dispensing chamber 24 may be separated by a flexible diaphragm 28. A substantially rigid housing 29, such as a hard plastic housing 29, may surround the water collection, extraction, and dispensing chambers 20, 22, 24.

In certain embodiments, the water collection chamber 20 may include an open end 30, allowing the water collection chamber 20 to collect water. This may allow the water collection chamber 20 to be replenished with water when the plant 12 is watered, such as may occur during rainfall, sprinkler operation, or manual watering. If desired, the water collection chamber 20 may contain a sponge or other water-retaining material to prevent water from evaporating from or spilling from the chamber 20. In certain embodiments, the water collection chamber 20 may include a flared rim 32 to increase the surface area of the open end 30 and aid in collecting water. If desired, the open end 30 may be covered with a porous protective screen 34 to allow water to enter but to prevent insects or debris from entering the water collection chamber 20.

In other embodiments (not shown), the water collection chamber 20 may be substantially closed and may collapse when water is transferred to the extraction chamber 22 through the water-transporting membrane 26. For example, the water collection chamber 20 may be provided in the form of a collapsible pouch or a bag. A fill port may be provided in the pouch or bag to add water to the chamber 20. During operation, the water collection chamber 20 may collapse as water is transferred to the extraction chamber 22. In certain embodiments, water may be added to the chamber 20 through the fill port once the water collection chamber 20 has fully collapsed.

In certain embodiments, the extraction chamber 22 may contain an osmotic medium, such as a salt or saline solution, to produce a concentration gradient across the water-transporting membrane 26. This may cause water to diffuse through the membrane 26 into the extraction chamber 22, creating hydraulic pressure within the extraction chamber 22. This pressure will cause the extraction chamber 22 to expand and push down on the flexible diaphragm 28. This, in turn, will cause the dispensing chamber 24 (containing a beneficial agent ideally in a liquid or slurry form) to contract and expel the beneficial agent through an outlet 36. The beneficial agent may then travel through a subterranean delivery channel 38, such as a hollow spike 38, where it may be delivered into the soil 14.

The rate the beneficial agent is released from the dispensing chamber 24 may be directly related to the rate the water diffuses through the membrane 26. This rate may be adjusted by modifying the permeability, thickness, or surface area of the water-transporting membrane 26, or by modifying the osmotic pressure differential across the membrane 26, such as by adjusting the salinity of a saline solution in the extraction chamber 22. The surface area of the membrane 26 is the characteristic that is most easily adjusted and provides the basis for the rate adjustment mechanism described in association with FIG. 9A.

Suitable osmotic media for use with the present invention may include solid granules, tablets, or powders of salts, such as sodium chloride, magnesium sulfate, sodium sulfate, or the like. Water soluble salts used in fertilizers such as nitrates and phosphates may be particularly advantageous as any accidental discharge of these osmotic media will only be beneficial to the plants. The osmotic media may also include salt solutions, such as sodium chloride solution, or water-soluble organic liquids such as polyethylene glycol. Some sugars, such as dextrose, lactose, fructose, and the like, may also provide good candidates for osmotic media. Other osmotic media may include gelling agents such as sodium carboxy methyl cellulose and sodium polyacrylate. Such osmotic media may form a gel when combined with water, thereby preventing accidental delivery to a plant. The permeability of water across the membrane 26 may be directly related to the osmotic pressure differential across the membrane 26, as well as secondary factors such as temperature.

In certain embodiments, the outlet 36 may be sized such that surface tension of the beneficial agent may keep the beneficial agent from leaking from the dispensing chamber 24 in the absence of hydraulic pressure. As water diffuses through the membrane 26, hydraulic pressure within the extraction chamber 22 may overcome the surface tension, allowing the beneficial agent to flow from the outlet 36. The size (e.g., length, diameter, etc.) of the outlet 36 may be adjusted, as needed, for beneficial agents having different viscosities. In certain embodiments, a plug may be provided in the outlet 36 prior to using the device 10. This plug may be removed manually or displaced in response to hydraulic pressure inside the dispensing chamber 24.

Figure 2B:
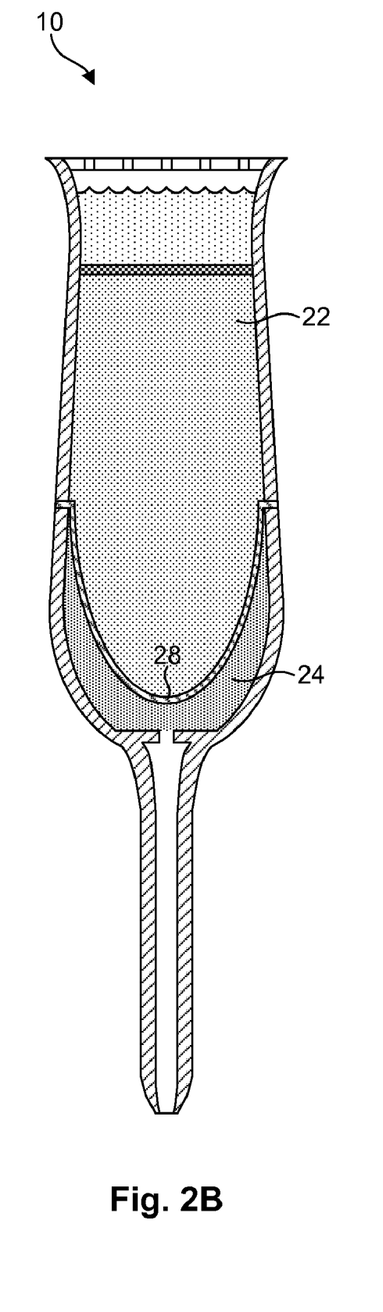
FIG. 2B is a cross-sectional profile view of the apparatus of FIG. 2A with the flexible diaphragm deflected in an opposite direction.

Referring to FIG. 2B, the delivery device 10 of FIG. 2A is illustrated after the extraction chamber 22 has expanded and the flexible diaphragm 28 has deflected to displace most of the beneficial agent in the dispensing chamber 24.

Figure 3:
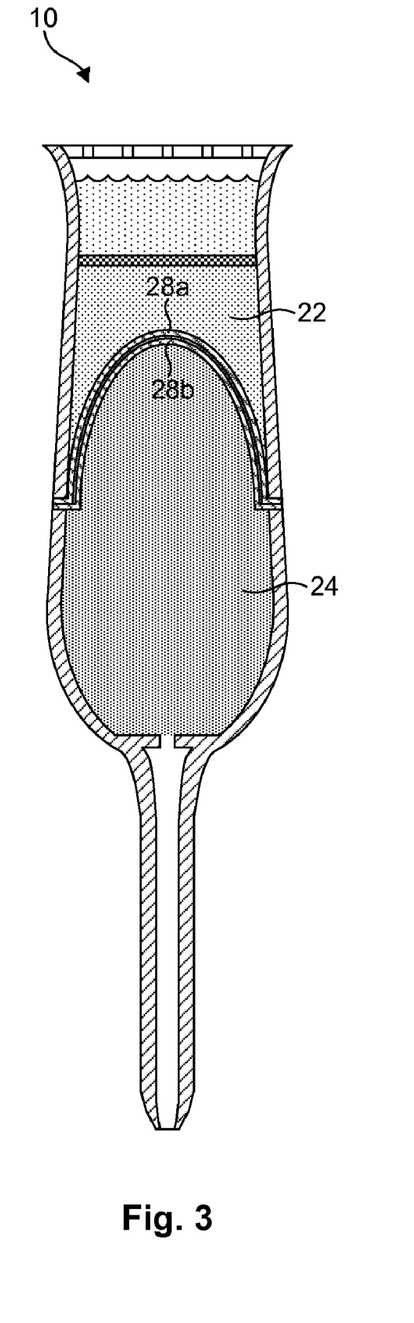
FIG. 3 is a cross-sectional profile view of one embodiment of an apparatus using a flexible diaphragm having multiple layers.

Referring to FIG. 3, in certain cases, a high concentration gradient may exist between the osmotic medium in the extraction chamber 22 and the beneficial agent in the dispensing chamber 24. This may be problematic particularly where the beneficial agent is a water-based solution or slurry. In such cases, the high concentration gradient may undesirably draw water through the flexible diaphragm 28 (which may be semi-permeable) into the extraction chamber 22. This is undesirable since it will impair the operation of the device 10.

In selected embodiments, the flexible diaphragm 28 may include multiple layers 28a, 28b to reduce water diffusion through the diaphragm 28. In certain embodiments, the layers 28a, 28b may be separated by a separator material such as air or another gas or mixture of gases. The separator material may also include water immiscible liquids including without limitation gels, oils, and viscous liquids. The separator material may also include hydrophobic fillers. In one embodiment, the separator material is a felt material. This may ensure that water and the osmotic medium (e.g., a saline solution) are not present on opposite sides of the same diaphragm layer 28a, 28b, thereby reducing the tendency of the water to diffuse through the diaphragm 28.

In other embodiments, a diaphragm 28, such as a single or multiple-layer diaphragm 28, may be coated with a water-impermeable material to prevent water from diffusing therethrough. For example, the diaphragm 28 may be coated with a metal, such as a thin metal foil, to prevent or reduce diffusion through the diaphragm 28. Such a diaphragm 28 may be produced, for example, by sputtering, spraying, vapor-depositing, or plasma-depositing a metal onto a flexible polymeric diaphragm 28.

Figure 4:
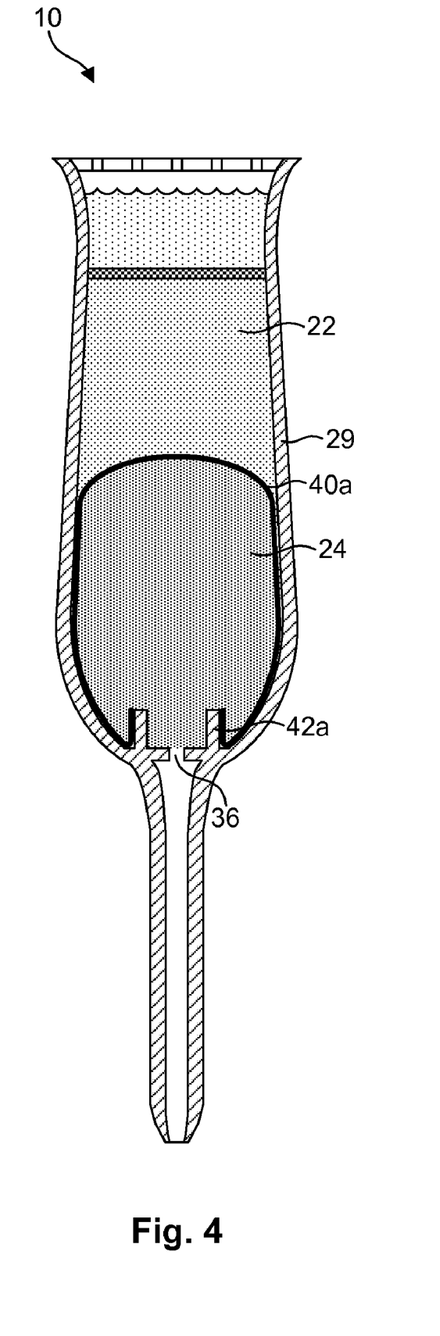
FIG. 4 is a cross-sectional profile view of one embodiment of an apparatus using a pouch for the dispensing chamber.
Figure 5:
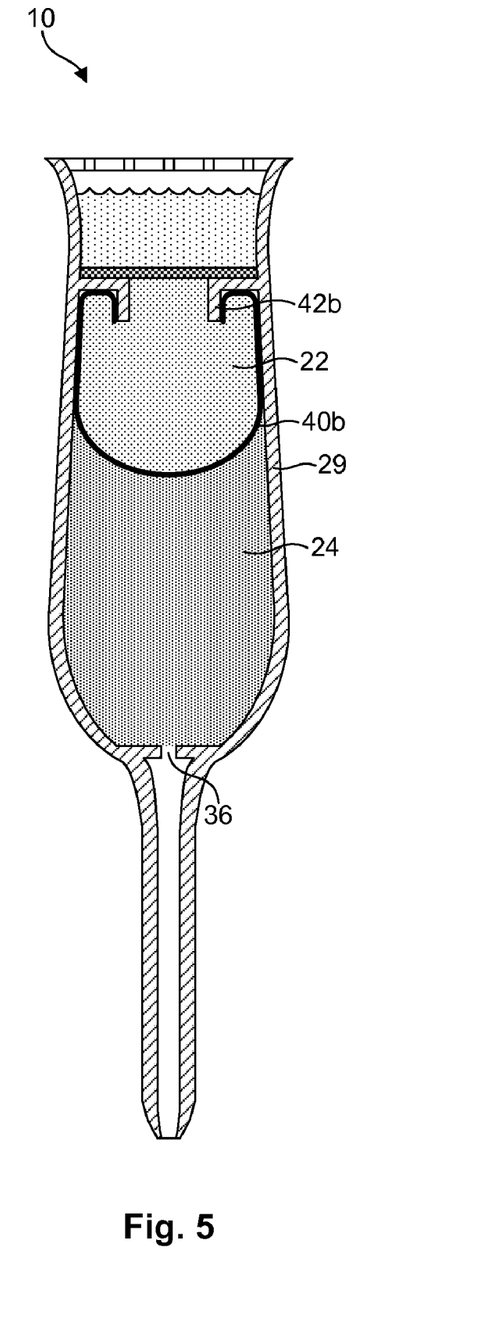
FIG. 5 is a cross-sectional profile view of one embodiment of an apparatus using a pouch for the extraction chamber.
Figure 6:
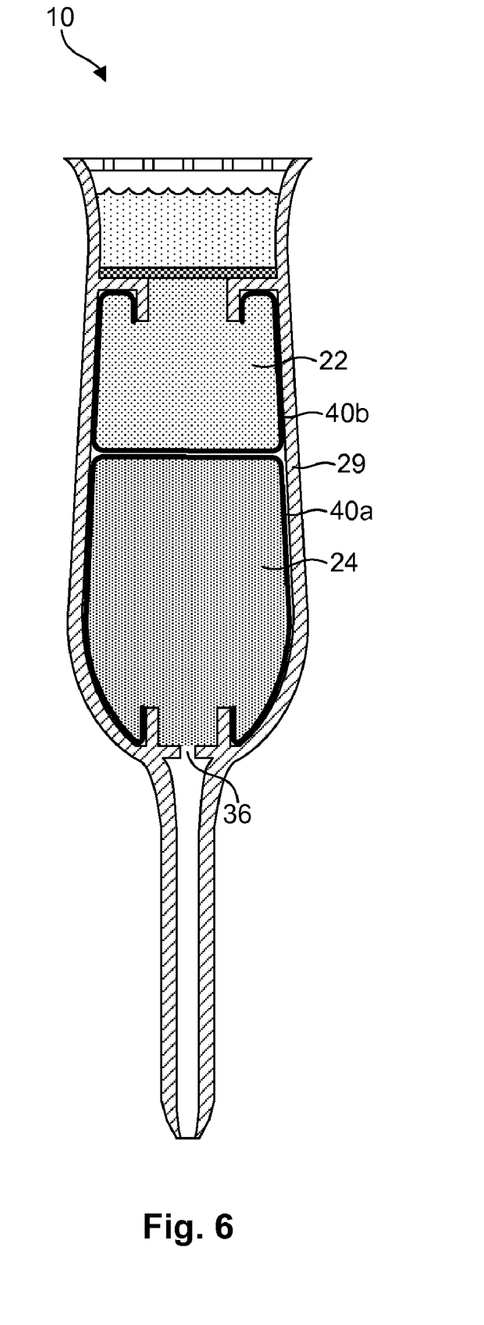
FIG. 6 is a cross-sectional profile view of one embodiment of an apparatus using a pouch for each of the extraction chamber and the dispensing chamber.

Referring to FIGS. 4 through 6, in selected embodiments, one or more pouches may be used in place of the flexible diaphragm 28. For example, referring to FIG. 4, a pouch 40a may be used to surround the dispensing chamber 24. This pouch 40a may be compressed when water is received into the extraction chamber 22, thereby expelling the beneficial fluid from the pouch 40a through the outlet 36. In selected embodiments, the pouch 40a may be configured to slip over a collar 42a, such as a cylindrical collar 42a, integrated into the housing 29.

FIG. 5 shows one embodiment of a delivery device 10 using a pouch 40b as the extraction chamber 22. This pouch 40b may expand as water is received into the extraction chamber 22, expelling the beneficial fluid through the outlet 36. To facilitate expansion, the pouch 40b may be folded or creased as needed prior to expansion. Like the previous example, this pouch 40b may be configured to slip over a collar 42b integrated into the housing 29.

FIG. 6 shows one embodiment of a delivery device 10 using pouches 40a, 40b for both the dispensing chamber 24 and the extraction chamber 22, respectively. In this example, expansion of the pouch 40b will cause compression of the pouch 40a, thereby expelling the beneficial agent through the outlet 36. One advantage of the dual pouch design is that it provides multiple layers between the osmotic medium and the beneficial agent. This may create an air layer between the pouches 40a, 40b which may reduce the chance that water in the beneficial agent will diffuse through both pouches 40a, 40b to contact the osmotic medium. This may also provide an extra layer of protection in the event one of the pouches 40a, 40b ruptures or breaks.

The pouches 40a, 40b may be constructed of flexible material that is relatively impermeable to the fluids in the extraction chamber 22 and the dispensing chamber 24. In certain embodiments, the pouches 40a, 40b may be constructed from a thin plastic film such as polyethylene, polypropylene, or the like. This material may, in certain embodiments, be coated with a water-impermeable material, such as metal, to prevent water from diffusing therethrough.

Figure 7:
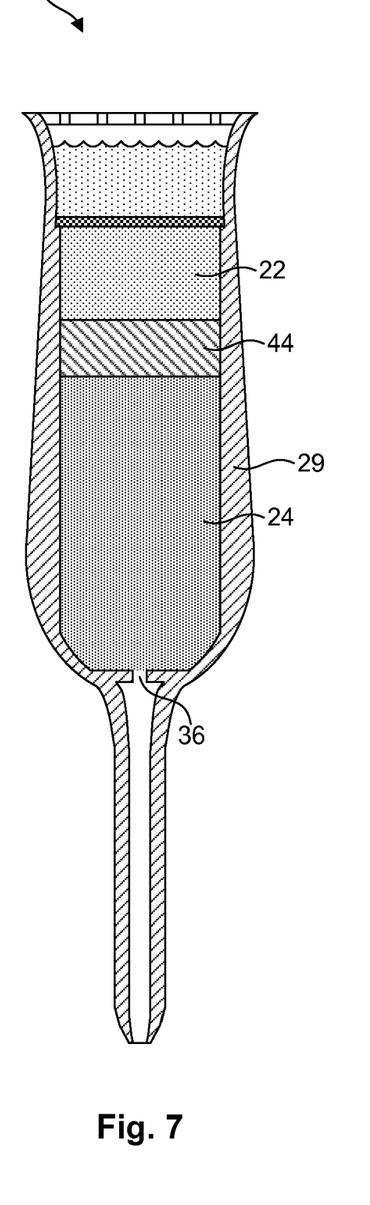
FIG. 7 is a cross-sectional profile view of one embodiment of an apparatus using a piston between the extraction chamber and the dispensing chamber.

Referring to FIG. 7, in certain embodiments, a piston 44 may be used in place of the flexible diaphragm 28 illustrated in FIG. 2A. This piston 44 may separate the extraction and dispensing chambers 22, 24 and provide means for transferring pressure therebetween. In the illustrated embodiments, the piston 44 may travel downward as water enters the extraction chamber 22, thereby expelling the beneficial agent through the outlet 36. To facilitate the linear travel of the piston 44, the inside diameter of the housing 29 may be cylindrical or otherwise shaped to facilitate linear movement of the piston 44.

Figure 8:
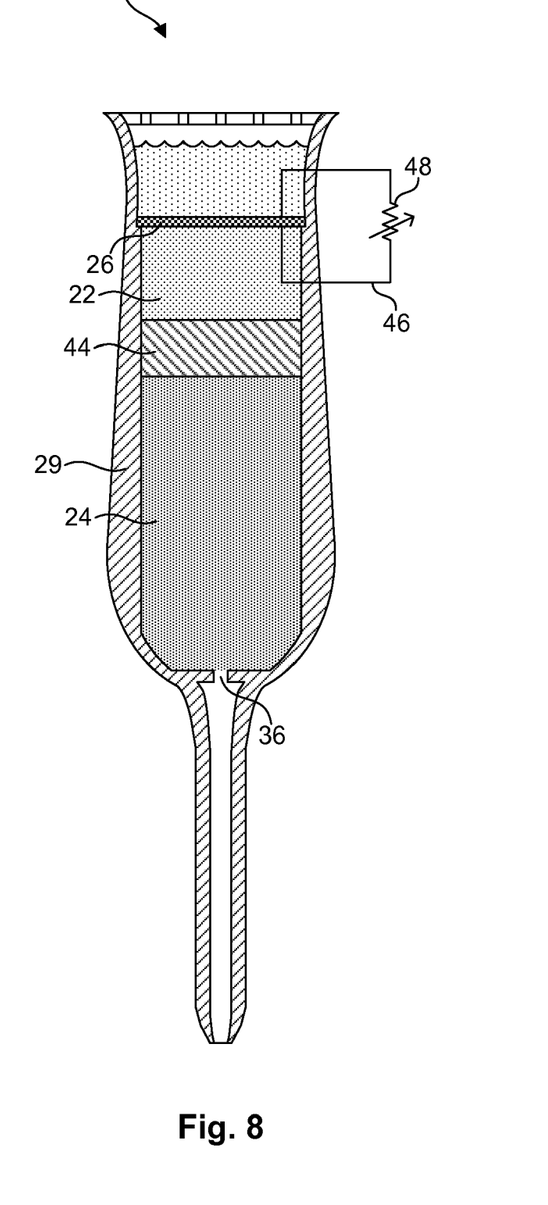
FIG. 8 is a cross-sectional profile view of one embodiment of an apparatus using a circuit to regulate the flow of water through the water-transporting membrane.

Referring to FIG. 8, in selected embodiments in accordance with the invention, the delivery device 10 may be configured to function using electro-osmosis. In this example, a circuit 46 may allow an electrical current to flow through the membrane 26. This current may allow water to flow from the water collection chamber 20 into the extraction chamber 20 through the membrane 26, thereby expelling beneficial agents through the outlet 36. In certain embodiments, the water transport rate may be directly proportional to the current flow through the membrane 26. Thus, the water transport rate may be changed by adjusting the current.

In selected embodiments, a variable resistor 48 may be used to regulate the current through the circuit 46, and thus the water transport rate through the membrane 26. In other embodiments, the resistance may be fixed, or have various discrete settings, to provide a fixed or discretely variable water-transport rate. Although shown in conjunction with the piston design of FIG. 7, the electro-osmotic membrane 26 may be used with any of the embodiments illustrated in FIGS. 2A through 7.

Figure 9A:
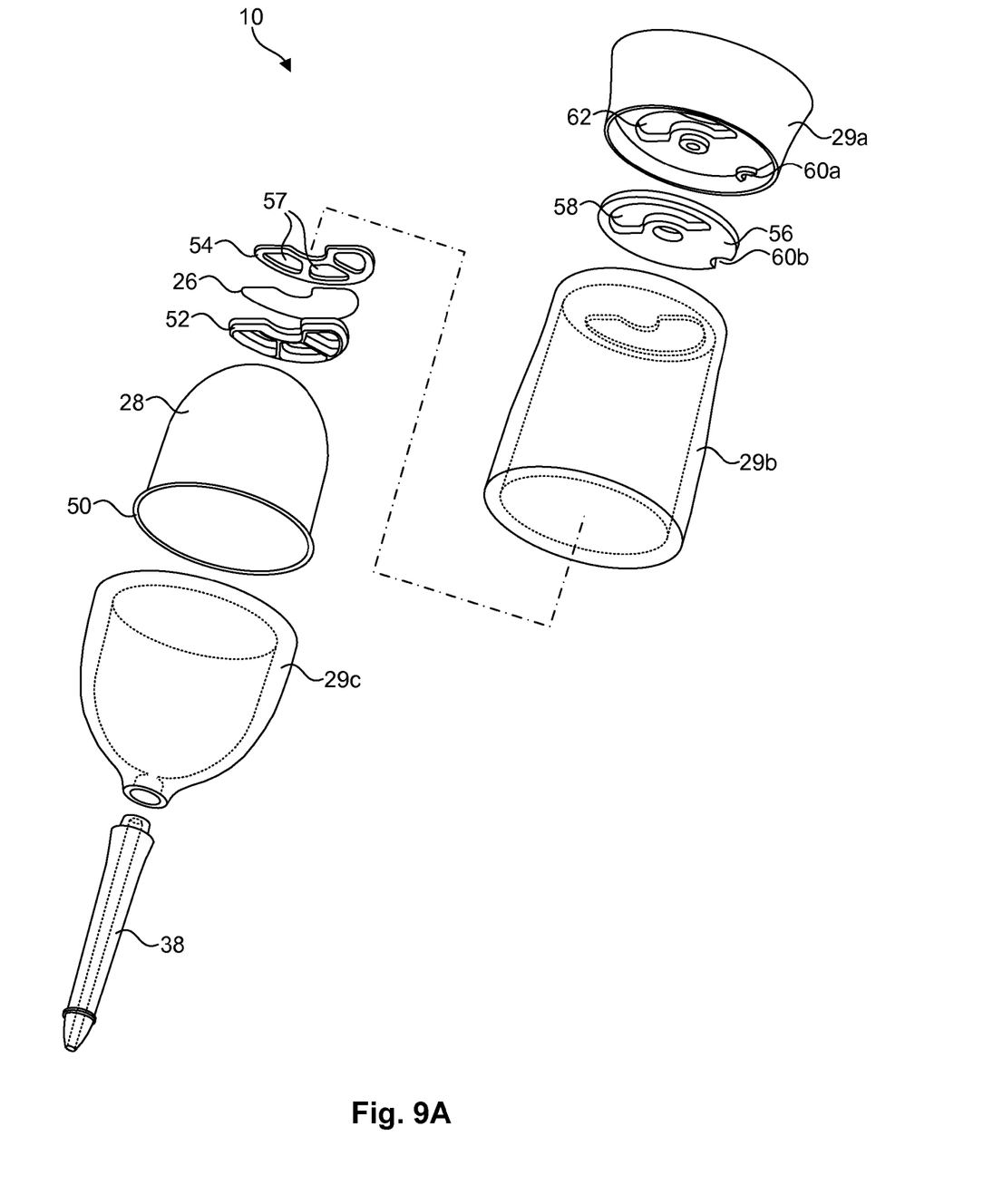
FIG. 9A is an exploded perspective view of one embodiment of an apparatus in accordance with the invention working in accordance with FIGS. 2A and 2B, and also showing one embodiment of a rate adjustment mechanism for use with the present invention.
Figure 9B:
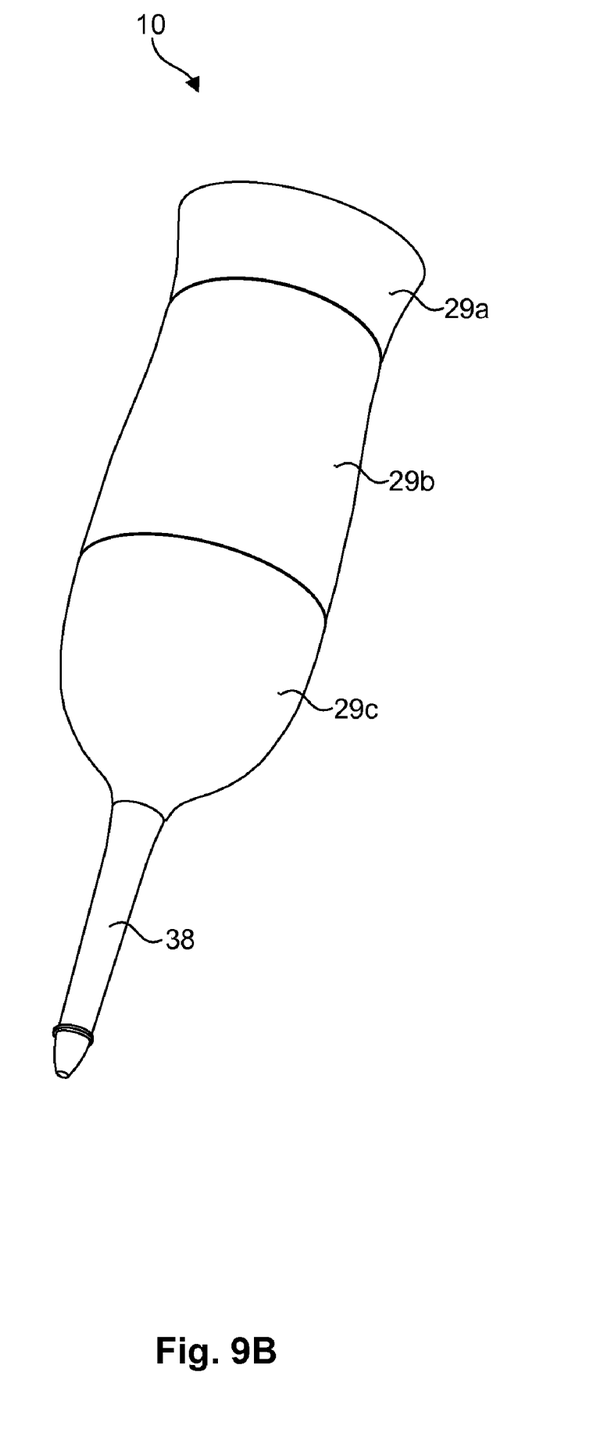
FIG. 9B is an assembled perspective view of the apparatus of FIG. 9A.

FIG. 9A provides an exploded perspective view of one embodiment of a delivery device 10 working in accordance with the device 10 of FIGS. 2A and 2B. FIG. 9B shows the same device 10 after assembly. As shown, in certain embodiments, a delivery device 10 may include a housing 29 that includes multiple components 29a-c. A subterranean delivery device 38, in this example a hollow spike 38, may connect to a bottom portion 29c of the housing 29. A flexible diaphragm 28 may reside between an upper portion 29b and a lower portion 29c of the housing. A rim 50 or lip 50 of the diaphragm 28 may create a seal between the upper and lower portions 29b, 29c to divide the extraction and dispensing chambers 22, 24 and prevent leakage therebetween.

In selected embodiments, a water-transporting membrane 26 may reside at or near a top of the housing portion 29b. The water-transporting membrane 26 may sit above a support 52 which may fit into the top of the housing 29b. A seal 54, such as an elastomeric gasket 54, may reside above the membrane 26 and seal the membrane 26 with respect to a rate adjustment mechanism, such as a rate selector disk 56. In selected embodiments, apertures in both the support 52 and the seal 54 may provide passages for water to flow. The apertures may also provide various discrete settings to control the rate of diffusion through the membrane 26.

In selected embodiments, a rate selector disk 56 may include an aperture 58 which may align with and expose one or more of the apertures 24 to the water in the housing portion 29a. This may change the surface area of the membrane 26 that is exposed to water, thereby modifying the rate of diffusion and thus the rate the beneficial agent is dispersed from the device 10. In selected embodiments, the housing portion 29a, containing the water collection chamber 20, may be configured to rotate relative to the rest of the housing 29b, 29c. The disk 56 may interlock with the housing portion 29a (using locking features 60a, 60b) and rotate therewith. An aperture 62 in the housing portion 29a may align with the aperture 58 in the disk 56. A user, prior to using the device 10, may rotate the housing portion 29a and the disk 56 to expose the membrane 26 and choose the rate the beneficial agents are expelled from the device 10.

For example, a first setting (exposing a single aperture 57) may be used for small plants, a second setting (exposing two apertures 57) may be used for medium-sized plants, and a third setting (exposing three apertures 57) may be used for large plants. The settings may also be thought of as adjusting the time period that the beneficial agent is released. Thus, a first setting (exposing a single aperture 57) may release a beneficial agent for three months, a second setting (exposing two apertures 57) may release a beneficial agent for two months, and a third setting (exposing three apertures 57) may release a beneficial agent for one month. The number of apertures 57 in the device 10 may be increased or decreased to accommodate more or fewer settings as needed. Furthermore, a setting may be provided such that none of the apertures 57 are exposed, effectively turning the device 10 off. In other embodiments, rather than having discrete settings, the apertures 57, 58 may be adjusted in a continuous manner to finely adjust the water diffusion rate.

The ability to control the release rate of the beneficial agent offers important advantages over conventional controlled-release fertilizers. Controlled-release fertilizers, in particular, may have a release rate that is set at the time of manufacture and cannot be changed thereafter. The release rate of the device 10, on the other hand, may be adjusted to fit a particular application. Furthermore, conventional "fast-release" fertilizers may be used and dispersed over time with the device 10, thereby having the effect of slow- or controlled-release fertilizers.

Figure 10:
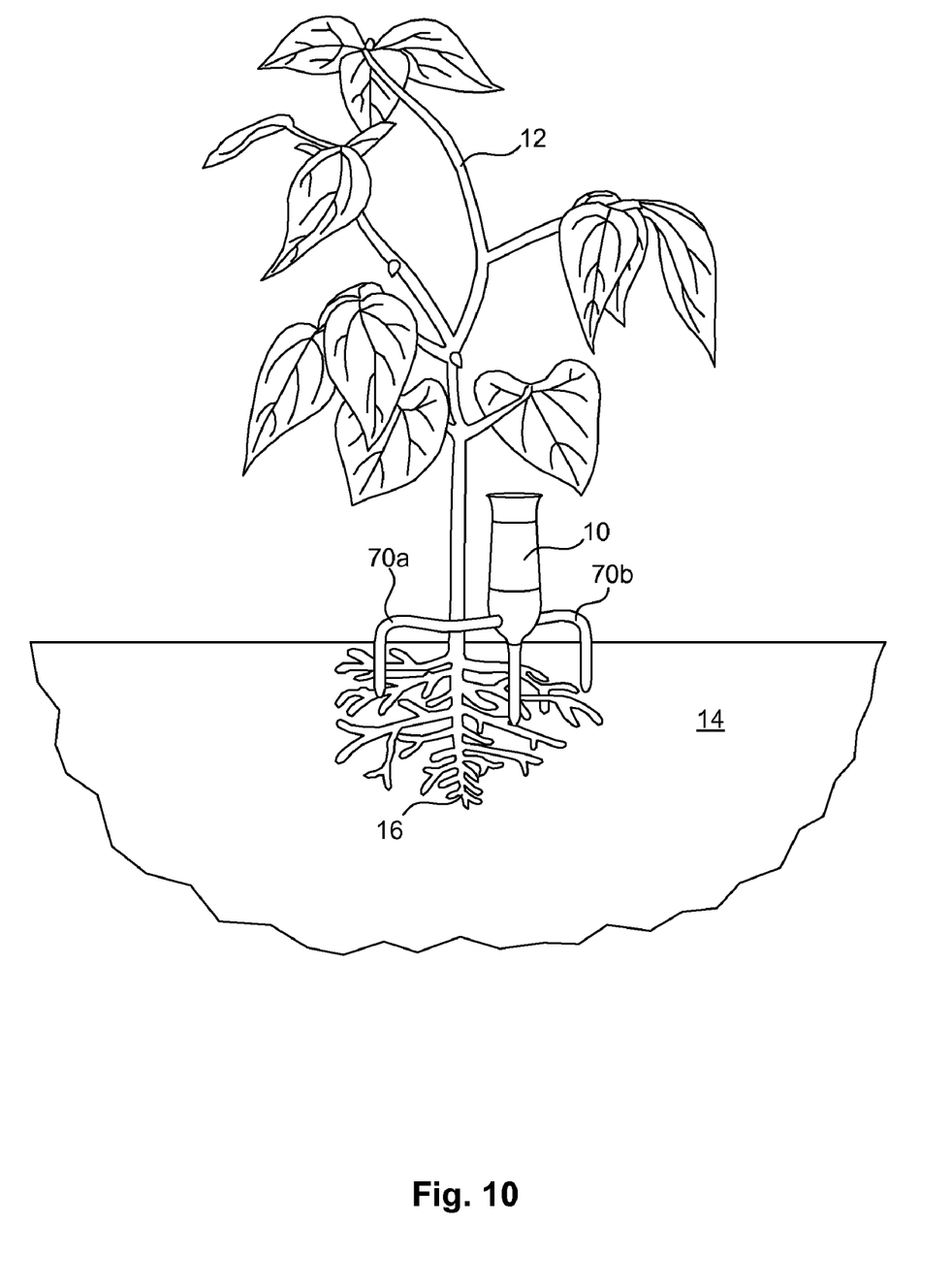
FIG. 10 is a perspective view of an alternative embodiment of an apparatus in accordance with the invention for delivering beneficial agents to a plant at multiple discrete locations.

Referring to FIG. 10, in other embodiments, a delivery device 10 in accordance with the invention may be configured to deliver beneficial agents to a plant 12 at multiple discrete locations. For example, a delivery device 10 may include one or more additional flexible or rigid delivery channels 70a, 70b that may be placed around a plant 12 either above the ground (similar to a drip system) or inserted into the ground to directly feed the root system 16. These channels 70a, 70b, like the subterranean delivery channel 38 previously described, may communicate with the dispensing chamber 24. The delivery device 10 may provide beneficial agents to the plant 12 at a release rate that is controlled, stable and/or predictable.

The present invention may be embodied in other specific forms without departing from its basic principles or essential characteristics. The described embodiments are to be considered in all respects as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to provide controlled delivery of a beneficial agent to a subterranean location, the apparatus comprising:
   a water collection chamber having a substantially open end to collect water;
   a water-transporting membrane in communication with the water collection chamber;
   an extraction chamber to receive water through the water-transporting membrane and into the extraction chamber, thereby expanding the extraction chamber;
   a dispensing chamber containing a beneficial agent and contracting in response to expanding the extraction chamber; and
   a subterranean delivery channel in communication with the dispensing chamber to deliver the beneficial agent to a subterranean location.

2. The apparatus of claim 1, wherein the extraction chamber and the dispensing chamber are separated by one of a flexible diaphragm and a piston.

3. The apparatus of claim 2, wherein the flexible diaphragm comprises a plurality layers.

4. The apparatus of claim 3, further comprising a separator material between the plurality of layers.

5. The apparatus of claim 4, wherein the separator material comprises a material selected from the group consisting of air, a gas, and a mixture of gases.

6. The apparatus of claim 4, wherein the separator material comprises a hydrophobic material 7. The apparatus of claim 2, wherein the flexible diaphragm is coated with a water-impermeable material.

8. The apparatus of claim 7, wherein the water-impermeable material is a metal.

9. The apparatus of claim 1, wherein at least one of the extraction chamber and the dispensing chamber is at least partially contained within a pouch.

10. The apparatus of claim 9, wherein the pouch is coated with a water-impermeable material.

11. The apparatus of claim 10, wherein the water-impermeable material is a metal.

12. The apparatus of claim 1, wherein the beneficial agent comprises a fertilizer.

13. The apparatus of claim 1, wherein the subterranean delivery channel is a hollow spike for penetrating the ground.

14. The apparatus of claim 1, wherein the extraction chamber contains an osmotic medium to draw water through the water-transporting membrane into the extraction chamber.

15. The apparatus of claim 14, wherein the osmotic medium comprises at least one of a salt and a saline solution.

16. The apparatus of claim 1, further comprising a circuit to regulate electrical current flowing through the water-transporting membrane, thereby regulating water flowing through the water-transporting membrane into the extraction chamber.

17. The apparatus of claim 1, further comprising a rate adjustment mechanism to control the rate at which water is received through the water-transporting membrane.

18. The apparatus of claim 1, further comprising at least one additional delivery channel, in communication with the dispensing chamber, to deliver the beneficial agent to at least one of a surface and a subterranean location.

19. An apparatus to provide controlled delivery of a beneficial agent to a subterranean location, the apparatus comprising:
   a water collection chamber having a substantially open end to collect water;
   a water-transporting membrane in communication with the water collection chamber;
   an extraction chamber to receive water through the water-transporting membrane and into the extraction chamber, thereby expanding the extraction chamber;
   a dispensing chamber containing a beneficial agent and contracting in response to expanding the extraction chamber;
   a flexible diaphragm disposed between the extraction chamber and the dispensing chamber, the flexible diaphragm comprising a plurality layers having a separator material between the plurality of layers, and wherein the separator material comprises a hydrophobic material;
   a subterranean delivery channel in communication with the dispensing chamber to deliver the beneficial agent to a subterranean location; and
   a rate adjustment mechanism to control the rate at which water is received through the water-transporting membrane.

* * * * *